Oct. 24, 1961 D. V. GEPPERT 3,005,962

BEAM TUBE OSCILLATOR HAVING ELECTRON REFLECTING MEANS PROVIDING REGENERATIVE FEEDBACK

Filed Jan. 7, 1957 3 Sheets-Sheet 1

INVENTOR.
DONOVAN V. GEPPERT

BY Spencer E. Olson

ATTORNEY

INVENTOR.
DONOVAN V. GEPPERT
BY
Spencer E. Olson
ATTORNEY

Oct. 24, 1961 D. V. GEPPERT 3,005,962

BEAM TUBE OSCILLATOR HAVING ELECTRON REFLECTING MEANS PROVIDING REGENERATIVE FEEDBACK

Filed Jan. 7, 1957 3 Sheets-Sheet 3

INVENTOR.
DONOVAN V. GEPPERT

BY Spencer E. Olson

ATTORNEY

United States Patent Office 3,005,962

Patented Oct. 24, 1961

3,005,962

BEAM TUBE OSCILLATOR HAVING ELECTRON REFLECTING MEANS PROVIDING REGENERATIVE FEEDBACK

Donovan V. Geppert, Mountain View, Calif., assignor, by mesne assignments, to Sylvania Electric Products Inc., Wilmington, Del., a corporation of Delaware Filed Jan. 7, 1957, Ser. No. 632,825
1 Claim. (Cl. 331—81)

The present invention relates generally to electrical converters and/or oscillators, and more particularly is concerned with the conversion of the energy of a unidirectional current into the energy of an alternating electromagnetic field. More specifically, the invention relates to that class of devices using an electron beam projected within a highly evacuated enclosure through space-resonant devices to convert unidirectional energy in the electron beam into alternating electromagnetic energy in the space resonant devices.

One such device, and to which the apparatus of the present invention is superficially similar, is the "klystron" which (with the exception of the "reflex" klystron) may be used as an oscillator or amplifier and includes two or more space-resonant devices excited and coupled by a beam of electrons projected through the electromagnetic fields contained in the space-resonant devices. The first space-resonant structure is commonly called the "buncher," and functions alternately to accelerate and decelerate the electrons at the frequency of oscillation of the field of the "buncher," and the second, called a "catcher" converts the energy in the bunched electron beam into electromagnetic field energy. Actually, however, the term "buncher" as applied to the first device is a misnomer, inasmuch as it really only velocity-modulates the electrons in the beam emerging therefrom, the "bunching," i.e., conversion of velocity-modulation to density or current modulation of the beam, occurring in a relatively long, field-free drift region.

While tubes of the "klystron" type enjoy widespread acceptance, their principle of operation imposes certain inherent disadvantages and limitations on their effectiveness and usefulness. As just mentioned, attendant the requirement of a field-free drift tube for "bunching," the electron beam length is correspondingly long, creating a problem of focusing the electrons and limiting the perveance of the beam, which in turn, limits the power-handling capabilities of the tube. Moreover, it can be shown that the power gain of a practical "klystron" amplifier of the two-cavity type cannot have a power gain of over 15 to 20 db, and many klystrons in actual production and operation have 10 db or less power gain. Gains higher than this can be achieved with multi-cavity klystrons, but of course at the expense of a more complicated structure and the requirement of tuning three or more resonant devices. Moreover, two-cavity klystrons have an efficiency of only 20 to 30%, and even multi-cavity klystrons achieve only 40 to 50% efficiency.

The principle object of the present invention lies in the provision of a novel method of accomplishing density or current modulation of a velocity-modulated electron stream.

Another object of the invention is to provide in an electrical converter of the electron beam type a novel method of accomplishing density or current modulation of a velocity-modulated electron stream.

Still another object of the present invention is to provide an electrical converter of the above character employing a novel principle of operation which enables an arrangement of parts to effect a reduction in beam length and making possible a higher perveance beam and/or the elimination of magnetic focusing fields.

Another object of the invention is to provide a novel electrical converter of the electron beam type capable of operating as an efficient generator and/or amplifier of ultra-high-frequency alternating currents and capable of delivering large power.

Another object of the invention is to provide a new method of accomplishing density or current modulation of the electron beam in an electrical converter of the above character which obviates the requirement for a field-free drift tube.

Another object of the invention is to provide a novel electrical converter of relatively simple construction which by simple adjustment may alternatively be employed as an oscillator, as an oscillator and amplifier, or as an amplifier having "class A," "class B," or "class C" operation.

Another object of the invention is to provide a novel oscillator of the above character which may be readily frequency modulated and having a larger bandwidth and greater modulation sensitivity than available oscillators of this type.

Another object of the invention is to provide an electrical converter of the above character which may be readily amplitude modulated whether operating as an amplifier or oscillator-amplifier.

Another object of the invention is to provide an electrical converter of the above character which has zero frequency pulling when operated as an oscillator or generator of radio frequency energy.

A primary distinction between the "klystron" (both the two-cavity type and the reflex type will be involved in the discussion) and the present invention is the manner in which "bunching" or density modulation of the electron beam is accomplished. Although the present invention may employ a device for performing the function of the improperly named "buncher" of a "klystron" of velocity modulating an electron stream, density modulation is accomplished by sorting the electrons in the stream in accordance with their velocities, those having velocities below a predetermined velocity being reflected and those having velocities in excess of the predetermined velocity being transmitted.

Apparatus employing this new principle of "bunching" is very simple in its physical embodiment, as will be shown, and may take a variety of forms. In one basic form a device embodying the invention may comprise a source of electrons, such as cathode or electron gun, for projecting a stream of electrons through an input circuit arranged to provide electric fields for changing the electron velocities, means for sorting the velocity modulated electrons in accordance with their velocity, and an output circuit for taking energy from the beam which passes the velocity sorter. The input circuit may be at a positive potential relative to the source of electrons whereby the electrons passing through the input circuit have high average velocities. The velocity modulated electrons leaving the input circuit then encounter a decelerating field between the input circuit and the velocity-sorting means, which may be a grid at a potential near that of the electron source, the action of the grid being to reflect the slower electrons back toward the input circuit and to transmit the fast electrons. The electrons which are transmitted may be accelerated toward and through the output circuit, which is positive with respect to the velocity-sorter, where unidirectional energy in the then "bunched" electron stream is converted to electromagnetic energy in the output circuit. The dissipated electrons are caught by a collector electrode which may be a part of the output circuit.

The action just described is characteristic of the applicability of the invention to an amplifier, the velocity-sorter grid in this case being analogous to the control grid in an ordinary low-frequency triode, yet differing therefrom in that it is held at a constant potential, with variations in the transmitted current resulting from variations in the velocities of the incident electrons. If, for example, the potential of the sorting grid is made equal to the cathode potential, and the input circuit excited with an oscillatory signal, the electrons emerging from the input circuit are velocity modulated, as in a klystron. When the electric field in the region of the input circuit from which the electrons emerge, is "accelerating," this is equivalent to making the sorter grid more positive and the number of transmitted electrons increases. Conversely, when the electric field is "decelerating," this is equivalent to making the sorter-grid more negative and the number of electrons transmitted decreases. Thus, the beam current passing the grid is amplitude modulated in time in accordance with the sinusoidal time variations of the exciting signal. This may be called "class A" operation by analogy with the similar operation of negative-grid tubes. Alternatively, the sorter may be set at approximately cut-off potential to provide an operation similar to "class B" operation of negative grid tubes, or may be made still more negative to provide "class C" type of operation. Thus, the "velocitron" may be operated in any of the classes of operation common to conventional negative-grid tubes employed at low frequencies, merely by changing the potential of the velocity-sorter grid.

By virtue of the novel velocity-sorting feature, the invention may also be applied in a combination oscillator-buffer amplifier. By operating the velocity-sorter grid at a potential where some of the electrons are transmitted and others reflected, not only is the transmitted beam current amplitude modulated, but the reflected current is similarly modulated, whereby the alternating component of the reflected current may be utilized to "excite" or "drive" the input circuit just as the transmitted electrons "excite" or "drive" the output circuit. Thus, a feedback loop exists consisting of the input circuit velocity modulating the original electron stream from the cathode, conversion of velocity modulation to density or amplitude modulation of the electron stream at the velocity-sorter, and excitation of the input cavity by the reflected amplitude modulated electron stream. This feedback may be either regenerative or degenerative, and if it is regenerative or "positive" and the feedback "gain" sufficiently high, the input circuit may sustain oscillations without external drive, which oscillations are amplified by the output circuit.

The operation of the input circuit as an oscillator just described resembles the operation of a reflex-klystron, differing therefrom, however, in that the bunching mechanism is one of velocity-sorting instead of drift-type bunching. Thus, the invention provides a basically new type of oscillator which is operable independently of the output circuit. Indeed, the output circuit may be eliminated and replaced with a simple collector electrode to remove those electrons transmitted beyond the velocity-sorter, and power extracted from the single input circuit. However, it may be advantageous to retain the output cavity because more power can be extracted therefrom than from the input cavity, and because the resulting tube is free from frequency "pulling," or frequency changes due to load changes.

The power output and frequency versus velocity-sorter voltage characteristics of the oscillator are similar in shape to those of the reflex klystron, and accordingly the tube may be frequency modulated by impressing a modulating signal on the velocity-sorter grid. The present oscillator, however, has a larger bandwidth and greater modulation sensitivity than a reflex klystron and requires only one power supply (for the input circuit), whereas the reflex klystron requires a repeller voltage supply in addition to a cavity supply.

The output of the tube, whether operating as an amplifier or as an oscillator-amplifier may also be amplitude modulated by modulating the direct current voltage to the output circuit. Thus, the invention provides a very versatile, essentially "all-purpose" microwave tube.

Other objects, features and advantages of the invention will be apparent, and a better understanding of the construction and operation of devices in which it may find utility will be had from the following detailed description taken in connection with the accompanying drawings in which.

Figure 1:
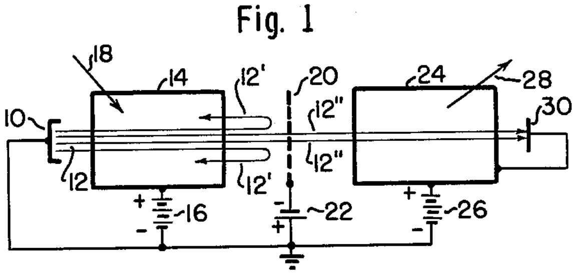
FIG. 1 is a diagrammatic sketch illustrating the invention in its basic form.

Referring to the drawings, and more particularly to Fig. 1, in its broad aspect the invention consists of a source of electrons, such as a cathode or electron gun 10, including suitable focusing means, to provide a stream of electrons, indicated at 12. An input circuit, shown by block 14, which may be a cavity resonator or a slow-wave structure, such as a helix, capable of supporting high-frequency electromagnetic oscillations, is coupled to the electron stream and arranged to provide electric fields which interact with the electrons in such a manner that the electrons become velocity modulated, in this respect corresponding to the operation of a two-cavity klystron. It is to be understood, however, that block 14 may, in the broadest aspect of the invention, represent any means capable of velocity modulating the electron stream emerging therefrom. The input circuit 14 is at a positive potential relative to the cathode 10, provided by a voltage source shown as a battery 16, the cathode being shown at ground potential, so that electrons passing therethrough have high average velocities. Oscillatory energy from an external source may be coupled to excite the input circuit, as indicated by the arrow 18. After leaving the input circuit 14, the electrons encounter a decelerating field between the positive input circuit and a grid 20 which is maintained near or below the potential of the cathode 10, as by battery 22. The function of the grid 20 is to reflect the slow electrons, represented by the curved arrows 12' and to transmit the faster electrons, represented by lines 12''. The reflected electrons 12' may return through the input circuit 14 and interact therewith in a favorable manner to re-inforce the oscillations in input circuit 14 (as will be more fully discussed) or they may be phased such that a degenerative condition exists and oscillations are not set up. Alternatively, means may be provided to prevent or minimize the return of reflected electrons to the input circuit. The electrons 12'' which are transmitted through the grid 20 are accelerated toward an output circuit 24, which may be a cavity resonator or a slow wave structure similar to input circuit 14, under the influence of the positive potential at which it is maintained, as by battery 26. The electrons pass through and interact with the output circuit, giving up energy thereto to excite oscillations in the output circuit which may be extracted therefrom as indicated by arrow 28. The dissipated electrons are caught by a suitable collector electrode 30 which may be a part of and at the same potential as the output circuit.

The electron source 10, interaction regions 14 and 24, grid 20 and collector 30 are understood to be housed in a suitable vacuum enclosure as in conventional types of high-vacuum tubes. Likewise in FIGS. 2, 7, 10 and 12, to be subsequently described, there is also understood to be a suitable vacuum enclosure for the appropriate elements. The vacuum envelope has been omitted from all of these drawings for the sake of clarity.

The input and output circuits 14 and 24 of FIG. 1 may, for example, be cavity resonators of the re-entrant type, the device being thus diagrammatically shown in FIG. 2, with suitable power supplies and meters, and to which reference will be made together with FIGS. 3, 4, 5 and 6, for a more detailed description of one embodiment of the invention. A beam of electrons is provided by a suitable cathode 40 and projected through input cavity resonator 42 in which exists an alternating electric field, externally excited, for example, through a suitable input connection, shown as a coaxial cable and coupling loop 44. The electric field existing across the gap of the resonator, i.e., at the grids 46, 48, through which the beam passes, alternately retards and accelerates, i.e., velocity modulates, the electrons, and they all travel along through a decelerating field toward velocity-sorter grid 50. There, depending on the potential of the grid, certain of the retarded electrons are reflected back and certain of the accelerated electrons pass through the grid and enter output cavity resonator 52, which may have spaced grids 54 and 56. The direct current energy in the electron beam entering cavity resonator 52 is converted into radio frequency energy in the resonator and may be extracted therefrom, as by a coupling loop and coaxial cable 58, the dissipated electrons being caught by a suitable collector electrode 60.

Figure 3:
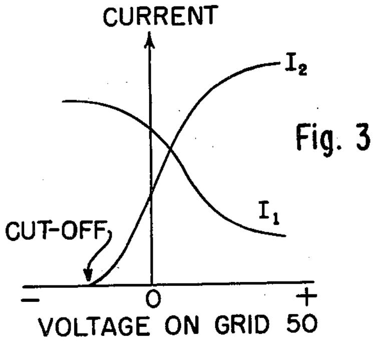
FIGS. 3, 4, 5 and 6 are curves useful in explaining the operation of the invention.

As in the diagrammatic representation of FIG. 1, the cathode 40 may be operated at ground potential, the input cavity 42 at a potential positive with respect to the cathode, provided by battery 62, the output cavity also at a positive potential with respect to the cathode, provided by battery 64, and the velocity-sorter grid at or near the potential of the cathode, as by battery 66. With meters 67 and 68 connected as shown to measure the current $I_1$ to the input cavity 42 and the current $I_2$ to the output cavity 52, respectively, FIG. 3 illustrates the manner in which the currents vary as the potential of grid 50 is varied with the potentials on the input and output circuits held constant. When the velocity-sorter grid 50 is at zero potential, some of the electrons from the cathode (having been accelerated by and having passed through the input cavity grids 46 and 48) are reflected back to the input cavity and some are transmitted on through the grid to the output cavity 52. When the grid is made more negative (with respect to the cathode), more of the electrons are reflected and fewer are transmitted, and if made negative enough, all of the electrons are reflected and none are transmitted, thus making $I_2$ equal to zero. When the velocity-sorter is made positive, more electrons are transmitted and fewer are reflected, and if made sufficiently positive, essentially all the electrons are transmitted and none are reflected, thus making $I_2$ a maximum and $I_1$ a minimum. $I_1$ does not go to zero, however, because of interception of a certain number of electrons by the input cavity grids 46 and 48.

Thus the velocity-sorter grid 50 is analagous to the control grid in an ordinary low frequency triode, but unlike the low frequency version, the velocity-sorter grid is held at a constant potential in operation, the variation in transmitted current $I_2$ being obtained by virtue of a variation in the velocities of the electrons approaching the grid. To explain, assuming grid 50 as being at zero potential, then if an alternating voltage is set up across the grids 46 and 48 of the input cavity by feeding a radio frequency signal into cavity 42 at the resonant frequency of the cavity, the electrons emerging from the input cavity are velocity modulated, as in a klystron. When the electric field in the input cavity "gap" is "accelerating", (FIG. 4), this is equivalent to making the potential of the velocity-sorter grid 50 positive, and hence $I_2$ increases. Conversely, a "decelerating" field in the input "gap" is equivalent to making grid 50 negative, and hence $I_2$ decreases. Thus $I_2$ becomes amplitude moduated with time, as shown in FIG. 4, in accordance with the sinusoidal time variations of the input signal, to provide, in effect, an operation analagous to "class A" operation of negative-grid tubes.

Figures 4, 5:
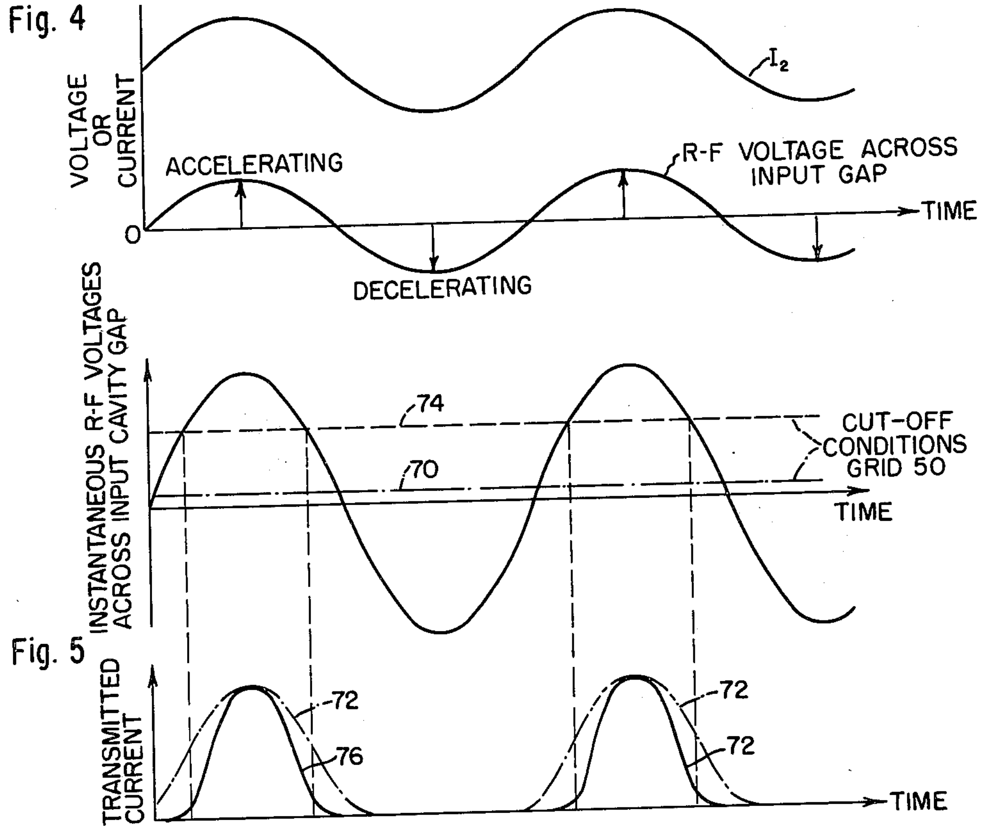

Referring to FIG. 5, the upper portion of which shows the variations of the input gap R.-F. voltage with time, if the potential of grid 50 is set at approximately the cut-off value (FIG. 3) represented by dot-dash line 70, the current transmitted beyond the grid is in accordance with curve 72 (in the lower portion of the plot), which, it is seen, is similar to "class B" operation of negative-grid tubes. If grid 50 is made still more negative, for example as represented by dotted line 74, the waveform of transmitted current $I_2$ shown at 76 is obtainable, resembling "class C" operation.

The output or "catcher" cavity 52 is operated at a high potential, whereby those electrons which penetrate the velocity-sorter grid 50 (whatever class of operation) are subjected to a strong accelerating field wherein they are accelerated to a high velocity and pass through the output cavity gap, retaining, however, the "bunching" afforded by the velocity-sorter grid. Thus the charge density varies with time at the point where the beam enters cavity 52, the beam therefore being equivalent to a pulsating current flowing through the cavity. The fundamental A.-C. component of this pulsating current excites cavity 52 (which is tuned to the same resonant frequency as the input cavity 42) in accordance with the well-known principle of operation of the catcher cavity in the klystron. The dissipated electrons are caught by collector electrode 60, which may be a separate element as shown, or it may be the back wall of cavity 52, in effect replacing grid 56.

Figure 2:
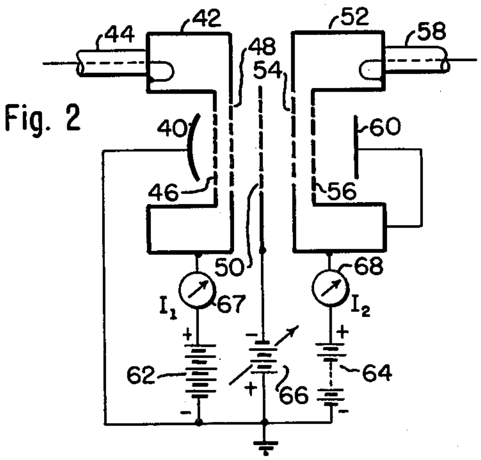
FIG. 2 is a diagrammatic cross-sectional view of a device according to the invention, embodying cavity resonators as the input and output circuits, and circuit therefor.

Thus it is seen that the apparatus of FIG. 2 is very similar in operation to that of conventional negative-grid tubes, in that it may be operated in any of the classes of operation common to such tubes, such as linear "class A" operation for small-signal amplification, linear "class B" operation for larger-signal amplification, or "class C" operation where linearity is not required.

In a preliminary model of the device diagrammatically illustrated in FIG. 2 which has been successfully operated, when grid 50 was operated at a potential to provide small-signal "class A" operation, a power gain of 10 db was attained at a frequency of 500 megacycles, and it is expected that with certain design refinements a power gain of 20 db or more will be readily attainable. With grid 50 operated at a potential to provide large-signal "class C" operation, the power gain was somewhat lower, but nonetheless proved the effectiveness of the device for this type of operation, a power output of up to 5 watts having been obtained under "class C" conditions. The preliminary model had an output cavity conversion efficiency as great as 40% and the overall efficiency of the device measured as high as 25%. (Output cavity efficiency equals the R.-F. power output divided by the D.-C. power input to the cavity, and overall efficiency is equal to the R.-F. power output divided by the sum of the D.-C. power inputs to the input and output cavities.) It is expected that with the design refinements mentioned earlier, the device will have a power output of 30 or 40 watts with output and overall efficiencies of up to 70% and 50% respectively. These high output conversion and overall efficiencies can be achieved by designing the tube so that the output cavity is insulated from the input cavity and operated at a much higher D.-C. potential than the input cavity. Under these conditions the D.-C. power input to the input cavity 42 can be made small compared to the D.-C. power input to the output cavity 52, with only a small reduction in overall efficiency from the output conversion efficiency.

Figure 6:
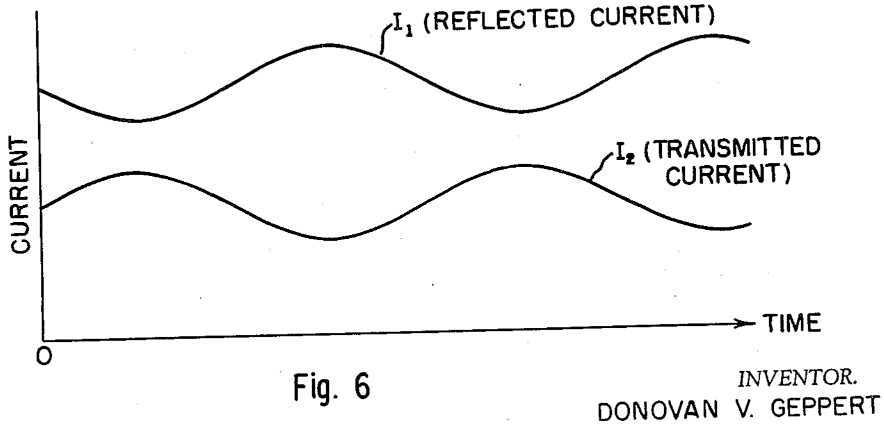

The embodiment of the invention illustrated in FIG. 2, instead of being employed as an amplifier for signals applied at 44, may be operated as a combination oscillator-buffer amplifier. If grid 50 is operated at such a potential that some electrons are transmitted and others reflected, it will be seen that not only is the transmitted current modulated, but the reflected current is also similarly amplitude modulated as shown in FIG. 6, except that the reflected current is of opposite phase. Thus, the A.-C. component of the reflected current may "excite" or "drive" the input cavity 42 just as the transmitted current "excites" or "drives" the output cavity 52. Thus, a feedback loop exists within the device, consisting of the input cavity 42 velocity modulating the original electron stream from cathode 40, conversion of velocity modulation to density or amplitude modulation of the electron stream at the velocity-sorter 50, and excitation of the input cavity 42 by the reflected amplitude modulated electron stream. This feedback is either regenerative or degenerative, for given grid spacings and electrode potentials, at the resonant frequency of input cavity 42. If the feedback is regenerative, which exists when the average transit time of the reflected electrons from the input gap out to the velocity-sorter 50 and back to the input gap is an odd number of half-periods at the operating frequency, and if the feedback "gain" is sufficiently high, the input cavity 42 will sustain oscillations without external drive. The electrons which are transmitted through velocity-sorter grid 50 excite output cavity 52, just as in the case when the device is operated as an amplifier, whereby the oscillations set up in the input cavity are amplified. When thus operated, the device has better frequency stability than a reflex klystron, for example, since the input cavity 42 is loaded only by its cavity losses and beam loading, and not by the external load, and no frequency pulling occurs.

Figure 7:
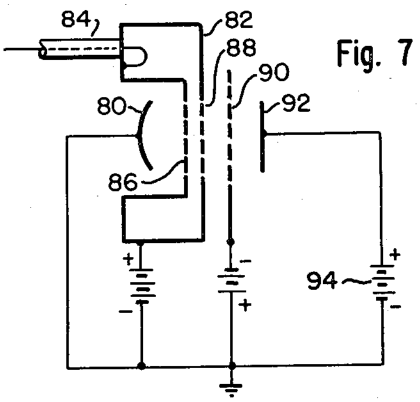
FIG. 7 is a diagrammatic cross-sectional view of apparatus embodying the invention, and circuit therefor, useful as an oscillator.

From the foregoing it is seen that the operation of input cavity 42 as an oscillator is independent of the output cavity 52 (which functions only as an amplifier), from which it follows that the output cavity may be eliminated, if desired, as shown in FIG. 7. Remaining is a single input cavity 82 having grids 86 and 88, a source of electrons 80, a velocity-sorter grid 90 and a suitable collector electrode 92, maintained at positive potential, as by battery 94, to remove those electrons transmitted beyond the velocity-sorter. Or, alternatively, collector 92 may be eliminated and sorter electrode 90 made a solid collector instead of an electron-permeable grid. In operation, the cavity 82 velocity modulates the electron stream passing therethrough, similarly to the cavity in a reflex klystron, but the mechanism of bunching the electrons returning to the cavity is one of velocity-sorting at the grid 90, unlike the drift-type bunching of the reflex klystron. Thus, FIG. 7 illustrates a basically new type of oscillator. As in the case of the device of FIG. 2, the potentials of the electrodes and their spacings are selected to produce regenerative feedback, and once oscillations are initiated, for example, by shot effects, the oscillations are sustained and R.-F. power may be extracted from the cavity 82 at output coupling 84.

Figure 8:
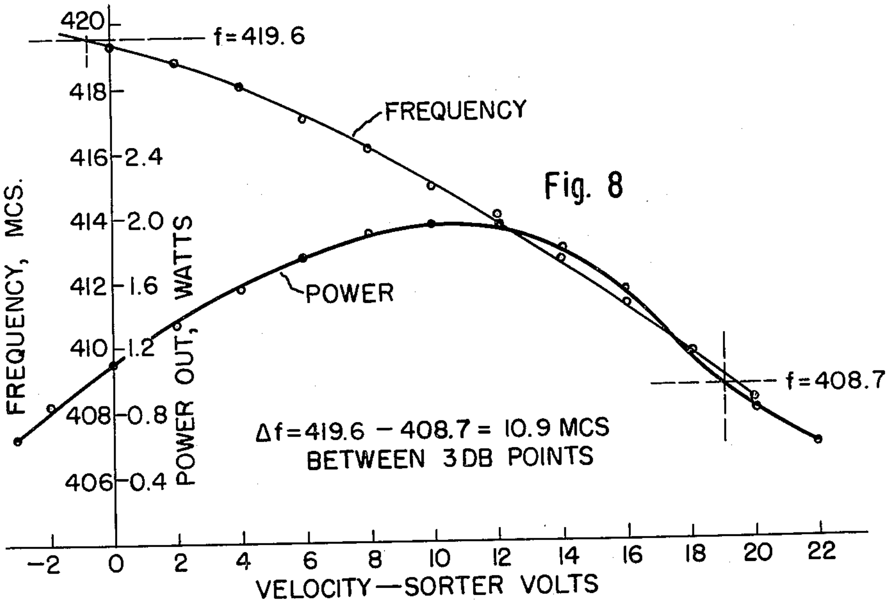
FIGS. 8 and 9 show certain operational characteristics of the apparatus of FIGS. 2 and 7, respectively.
Figure 9:
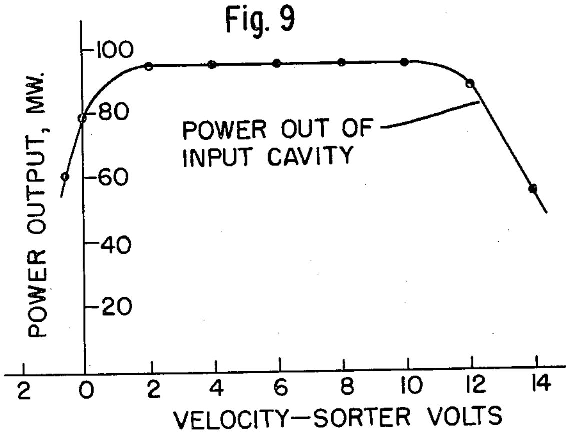

The performance of the preliminary model of the device, operated as a reflex oscillator-buffer amplifier, and as an oscillator was very satisfactory, as evidenced by the curves of FIG. 8 showing power output and frequency versus velocity-sorter voltage, and the curve of FIG. 9 showing power out of the input cavity versus velocity-sorter voltage. The data plotted in FIG. 8 was measured with the apparatus operated as an oscillator-amplifier (FIG. 2) with constant voltage on the input and output cavities of 140 volts and 150 volts, respectively, the power being extracted from output cavity 52. FIG. 9 shows the performance as a reflex-oscillator with the cavity 42 maintained at 135 volts and power extracted from cavity 42. It will be noted that when power is extracted from the input cavity (FIG. 9) the power is more constant over the mode than when the device is operated as an oscillator-amplifier and the power extracted from the output cavity. This is due to the selectivity of the output cavity. Even including the selectivity of the output cavity, however, the bandwidth (i.e., the amount of frequency shift between half-power points) is 2.5% which is higher than is normally obtained from a reflex klystron. Also, the modulation sensitivity (i.e., the rate of change of frequency with velocity-sorter voltage), in the curve of FIG. 8, 0.5 megacycle per volt, is very high compared to that of a reflex klystron (at the same frequency). This high modulation sensitivity is due to the fact that the transit time of the reflected electrons from the input gap out to the velocity-sorter grid and back to the input gap is very sensitive to velocity-sorter voltage as compared to the corresponding transit time in a reflex klystron as a function of repeller voltage. It will be noted from a comparison of the power curves of FIGS. 8 and 9 that the power output obtainable from the output cavity was about 13 db higher than the power output obtainable from the input cavity, which indicates that the buffer amplifier portion of the device had a 13 db power gain when the tube was operating as a combination reflex-oscillator-buffer amplifier.

Figure 10:
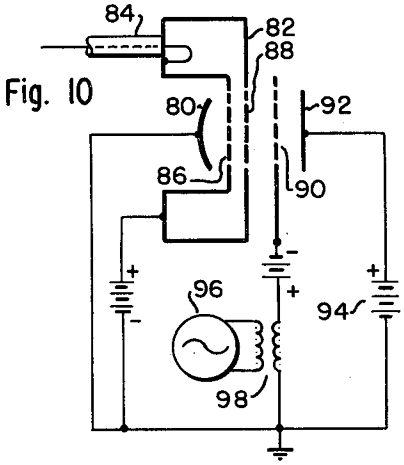
FIG. 10 is a diagrammatic cross-sectional view of apparatus similar to that shown in FIG. 7, and circuit therefor, useful for obtaining a frequency modulated signal.

As previously noted in connection with the curves of FIG. 8, the present frequency and power characteristics of the reflex oscillator are similar to the those of a reflex klystron, and accordingly, as in the klystron, the present oscillator may be frequency modulated, as shown in FIG. 10, by impressing the modulating signal on the velocity-sorter grid 90, for example, by a modulator 96 coupled to the grid via transformer 98. As stated earlier, the present oscillator has a greater modulation sensitivity than the reflex klystron, and moreover, requires only one power supply, for the cavity 82, whereas the reflex klystron requires a repeller voltage supply in addition to the cavity supply. The principle of operation of the device permits a design wherein the velocity-sorter bias may be zero, and the supply voltage for collector 92 in FIGS. 7 or 10 or output cavity 52 in FIG. 2 can be made the same as for cavity 82 in FIGS 7 or 10, or cavity 42 in FIG. 2, as the case may be.

Figure 12:
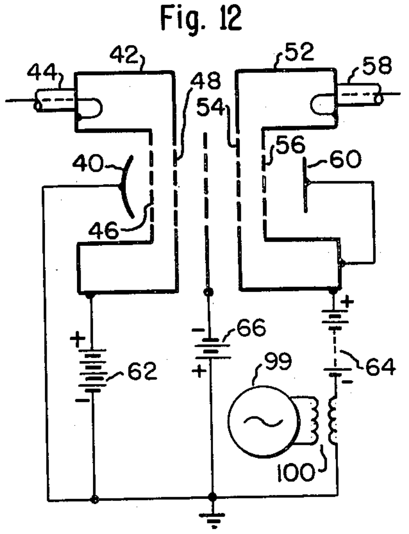
FIG. 12 is a diagrammatic view of apparatus embodying the invention, and circuit therefor, useful for obtaining an amplitude modulated signal.
Figure 11:
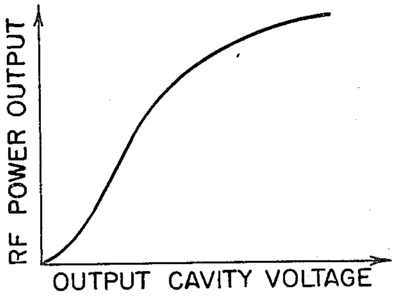
FIG. 11 is a curve showing another operational characteristic of apparatus embodying the invention.

From FIG. 11, which shows how the R.-F. power output of the output cavity varies with the output cavity voltage, it is seen that the device may be amplitude modulated (whether operating as an amplifier or as an oscillator-amplifier) by modulating the D.-C. voltage applied to the output cavity. For example, as illustrated in FIG. 12 (which is otherwise identical with FIG. 2) a modulating signal from modulator 99 may be superimposed on the voltage of battery 64 via transformer 100, to effect amplitude modulation of the output signal from output cavity 52.

From the foregoing it is seen that applicant has provided a novel method of achieving density or amplitude modulation of a velocity modulated stream of electrons, based on the sorting of electrons in accordance with their velocities. This concept finds particular utility in high frequency high-vacuum tubes of the electron beam type, and is particularly advantageous in that a device incorporating this feature may be operated in several modes of operation by a simple adjustment of the potential applied to the velocity-sorter electrode. While it has been convenient to explain the operation of the invention in connection with oscillatory circuits of the cavity resonator type, and the initial model of the apparatus thus embodied the invention, the invention is not limited thereto, inasmuch as certain slow-wave structures may be employed to velocity modulate an electron stream to which the velocity-sorting function of the invention may be applied, and such slow-wave structures may also be used to derive R.-F. energy from the "bunched" electron stream. And, although specific modulating circuits are disclosed, and specific apparatus shown for coupling energy to and from the oscillatory circuits illustrated, it will be understood that any of the many alternative techniques now available to the art may be employed without departing from the true spirit of the invention. Accordingly, it is the intention that the foregoing description and the drawings be construed as illustrative only, and not in a limiting sense, and that the appended claims be interpreted broadly as may be consistent with the spirit and scope of the invention.

What is claimed is:

A high frequency oscillator comprising, in combination, a single cavity resonator having a predetermined resonant frequency and provided with gap-defining, apertured walls perpendicular to the axis of symmetry of said oscillator, a cathode for emitting a stream of electrons, an electron collector, means including first and second sources of potential for biasing said resonator and collector positively relative to said cathode and for projecting a stream of electrons along a path from said cathode through said resonator to said collector, said resonator being operative to velocity modulate electrons emerging from said gap at said predetermined frequency, said aperture having a diameter such that the ratio of its diameter to that of the electron stream emerging from said gap is greater than 2, an electron permeable planar electrode in the path of said electron stream between said resonator and said collector, a third source of direct current potential connected to said electrode for maintaining said electrode at a negative potential with respect to said cathode, said electrode being spaced both electrically and mechanically from said gap-defining walls by a distance related to the potentials applied to said electrode and to said resonator and to said cathode such that a substantial portion of electrons velocity modulated by said resonator are reflected back through the gap-defining walls, the transit time for electrons traveling from said gap to said electrode and back to said gap being equal to an odd number of half-periods at said predetermined frequency whereby the reflected electron stream re-entering said gap is density modulated and the resonator excited at said predetermined frequency to maintain oscillations therein, the remaining portion of the electrons velocity modulated by said resonator passing said electrode and continuing along said path to said collector, said reflected stream constituting the sole source of regenerative feedback to said resonator, and means for extracting energy from said resonator.

References Cited in the file of this patent

UNITED STATES PATENTS

| | | |
|---|---|---|
| 2,405,611 | Samuel | Aug. 13, 1946 |
| 2,409,644 | Samuel | Oct. 22, 1946 |
| 2,616,038 | Hansen et al. | Oct. 28, 1952 |
| 2,653,270 | Kompfner | Sept. 22, 1953 |
| 2,702,349 | McArthur | Feb. 15, 1955 |

FOREIGN PATENTS

| | | |
|---|---|---|
| 937,062 | France | Aug. 6, 1948 |

OTHER REFERENCES

Proc. I.R.E., February 1939, pps. 106–116, "Velocity-Modulated Tubes," Hahn et al.